(12) United States Patent
Scherer et al.

(10) Patent No.: US 8,061,154 B2
(45) Date of Patent: Nov. 22, 2011

(54) COOLING SYSTEM FOR THE COOLING OF HEAT-PRODUCING DEVICES IN AN AIRCRAFT

(75) Inventors: Thomas Scherer, Hamburg (DE); Matthias Witschke, Hamburg (DE); Carsten Colberg, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 666 days.

(21) Appl. No.: 10/584,779

(22) PCT Filed: Dec. 30, 2004

(86) PCT No.: PCT/EP2004/014851
§ 371 (c)(1),
(2), (4) Date: Feb. 3, 2009

(87) PCT Pub. No.: WO2005/063568
PCT Pub. Date: Jul. 14, 2005

(65) Prior Publication Data
US 2009/0126900 A1    May 21, 2009

(30) Foreign Application Priority Data
Dec. 30, 2003    (DE) .................................. 103 61 645

(51) Int. Cl.
*B60H 1/32* (2006.01)
(52) U.S. Cl. ........................................ 62/244
(58) Field of Classification Search .................. 62/185, 62/243–244; 123/41.1; 165/41
See application file for complete search history.

(56) References Cited

U.S. PATENT DOCUMENTS

| | | | | |
|---|---|---|---|---|
| 4,744,408 A | * | 5/1988 | Pearson et al. | 165/254 |
| 5,058,390 A | * | 10/1991 | Sindermann et al. | 62/181 |
| 5,513,500 A | | 5/1996 | Fischer et al. | |
| 5,553,576 A | * | 9/1996 | Nikly | 123/41.01 |
| 5,671,607 A | | 9/1997 | Clemens et al. | |
| 6,131,398 A | | 10/2000 | Versteijnen | |
| 6,213,194 B1 | | 4/2001 | Chrysler et al. | |
| 2002/0134095 A1 | * | 9/2002 | Temmyo et al. | 62/179 |
| 2003/0042361 A1 | * | 3/2003 | Simadiris et al. | 244/118.5 |

FOREIGN PATENT DOCUMENTS

| | | |
|---|---|---|
| DE | 3812739 C1 | 7/1989 |
| DE | 4340317 A1 | 6/1995 |

OTHER PUBLICATIONS

Forms PCT/ISA/210, 220, 237 International Search Report for PCT/EP2004/O14851, mailed on Mar. 7, 2005.

* cited by examiner

*Primary Examiner* — Frantz Jules
*Assistant Examiner* — Emmanuel Duke
(74) *Attorney, Agent, or Firm* — Wood Herron & Evans LLP

(57) ABSTRACT

A cooling system for the cooling of heat producing devices in an aircraft is designed with a central cold producing device, at least one cold consumer and a cold conveyance system which connects the cold producing device and the cold consumer. With this cooling system, the cold conveyance system has at least one cooling circuit which supplies a cooled cold carrier medium from the cold producing device to at least one cold consumer and brings the cold carrier medium back to the cold producing device, so that at least one cold consumer is supplied with the cold produced in the cold producing device.

21 Claims, 2 Drawing Sheets

COOLING SYSTEM FOR THE COOLING OF HEAT-PRODUCING DEVICES IN AN AIRCRAFT

This application claims the benefit of International Application No PCT/EP2004/014851, filed on Dec. 30, 2004, under 35 U.S.C. §371 and/or as a continuation under 35 U.S.C. §120, and German Application. No. 103 61 645.4, filed on Dec. 30, 2003.

TECHNICAL FIELD

This invention relates to a cooling system for the cooling of heat-producing devices in an aircraft.

BACKGROUND

In the interior of an aircraft, besides the aircraft's air-conditioning system there are a variety of different technical devices which produce heat and which, in order to guarantee safe function, must be cooled. For this reason, different cooling systems have been provided in aircrafts for a long time which are associated as individual solutions to the respective technical devices which are to be cooled. The provision of this type of individual systems requires relatively large amounts of structural space within the aircraft and there is little flexibility. Moreover, this type of individual systems often makes direct use of ambient air as a heat sink for the elimination of heat from the technical devices to be cooled. However, this leads to undesirable heating up of the interior of the aircraft.

It is established practice, for example in accordance with DE 38 12 739 C1, to position a cooling chamber inside an galley of an aircraft near to the outer skin of the aircraft and to provide a cold air chamber between the cooling chamber and the outer skin of the aircraft. In the cold air chamber, air, as a cold carrier medium, is cooled down by means of heat exchange with the outer skin of the aircraft, and after cooling down it is supplied to the cooling chamber for the cooling down of a service trolley which is filled, for example, with drinks or food which are to be cooled down. The disadvantage, however, of this state of the art technology is that each cooling chamber requires a separate cold air chamber. This means that the distribution of space within the aircraft becomes relatively inflexible. Moreover, a reliable cooling function can only be provided when the aircraft is flying at great heights where the aircraft surroundings are very cold. If the aircraft is on the ground after landing, the cooling functions can only be guaranteed by an additional cold storage unit, the cold capacity of which is limited.

In response to this, it is an object of this invention to provide a cooling system of the type described above, which avoids the disadvantages of the current state of the art technology described above, and which has a simple structure and offers a high level of flexibility with regard to the installation and good adaptability to the current cold requirement.

SUMMARY OF THE INVENTION

This problem is solved by a cooling system for the cooling of heat producing devices in an aircraft which has a central cold producing device, at least one cold consumer and a cold conveyance system which connects the cold producing device and the cold consumer with each other, whereby the cold conveyance system has at least one cooling circuit which conveys a cooled cold carrier media from the cold producing device to the at least one cold consumer and back from this to the cold producing device, and whereby the at least one cold consumer is supplied with the cold produced in the cold producing device by means of the cold carrier medium circulating in the cooling circuit.

In accordance with the invention, the cold output required by the cold consumers can therefore be provided centrally from the cold producing device via the cooling circuit. The cold producing device can be positioned compactly within the aircraft, and in such a way that it does not interfere with other components of the aircraft. In this way, there is a high level of flexibility for the arrangement of the interior of the aircraft. In particular, the cooling system can be adapted to individual space partitioning within the aircraft.

A further embodiment of the invention provides that the cold producing device has at least two cooling machines which operate independently of one another and are coupled in parallel to the cold conveyance system. In this way, on the one hand, the maximum cold output of the cold producing device is increased, and on the other hand, the cooling system becomes more reliable. Even if one of the cooling machines fails, the cooling system is still able to provide a minimum cold output by means of at least one further cooling machine. Preferably, in accordance with one variation of the invention, the number of cooling machines for the cold producing device is chosen in such a way that the aircraft's cold requirement is covered during ground operation in which the external ambient temperature around the aircraft is considerably higher than when flying at great heights.

In order to increase the degree of efficiency of the cold producing device, and thereby also of the cooling system according to the invention, one aspect of the invention provides that the at least one cooling machine uses air from outside of the pressure cabin of the aircraft as a heat sink for dispensing heat, and that the warm expelled air is dispensed to the outside of the pressure cabin. In this way, it is guaranteed that the cooling system can dispense the heat which is released, without affecting the cabin air flow produced by the air-conditioning system and without heating up the aircraft cabin in an undesirable fashion.

In order to further increase the reliability of the cooling system in accordance with the invention, a number of different cooling circuits can be provided, which are essentially independent of one another. If one of the cooling circuits fails as the result of a technical fault, the at least one further cooling circuit is not affected by this fault. Separation of the cooling circuits in accordance with the invention can be accomplished, for example, in such a way, that one cooling circuit is provided on each side of the aircraft in relation to a longitudinal axis of the aircraft, respectively, and/or one cooling circuit is provided in the front and one in the rear half of the aircraft. Despite the provision of several circuits working independently of one another, according to another aspect of the invention it can be provided that cold consumers positioned in the centre of the aircraft are supplied in common with cold carrier medium by at least two cooling circuits. This measure also makes it possible for the device requiring cooling to continue being cooled sufficiently, even if one of the cooling circuits fails.

In one embodiment of the invention, at least one cooling machine produces cold by means of a cold vapour process. A cold vapour process offers the possibility of producing cold at relatively low temperatures with relatively little technical expenditure.

In order to be able to guarantee reliable conveyance of the cold carrier medium between at least one cold consumer and the cold producing device through the cold conveyance system, a further aspect of the invention provides that each cooling circuit has at least one cold carrier pump for the circulation of the cold carrier medium. In order to avoid a failure in one cold carrier pump meaning that the whole cooling circuit in question no longer functions, a further embodiment of the invention proposes that at least two cold carrier pumps are provided which are assigned to one and the same cooling circuit. Preferably, at least two cold carrier pumps are supplied with electric energy independently of one another.

In addition, in accordance with the invention, a storage unit for the intermediary storage of cold carrier medium can be associated to each cooling circuit. By means of the storage unit, thermally determined changes to the volume of the cold carrier medium and leakages within the cooling circuit can be leveled out to a certain degree.

Although individual cooling circuits of the cooling system in accordance with the invention can be hydraulically uncoupled from one another, in accordance with a further embodiment of the invention, at least two cooling circuits are thermally coupled via the cold producing device and/or via the heat exchanger of a cold consumer.

A further embodiment of the invention proposes that the at least one cold consumer has a secondary cold conveyance system in which, by means of a secondary cold carrier, preferably air, cold is transferred from the cold carrier medium. This solution principle is applied, for example, in an on-board kitchen (galley) in the aircraft. A galley air cooler is used here in order to transfer the cold from the cold carrier medium to the air used as the secondary cold carrier, and with this cooled air, for example food and drink is cooled.

An advantageous further embodiment of the invention proposes that a central control unit is provided which controls the cold output in each cooling circuit dependent upon at least one of the current parameters specifying cold requirement. In connection with this, it can also be proposed in accordance with the invention that the parameters specifying the current cold requirement reflect the temperature of the cold carrier medium at least one point of the cooling circuit, preferably at least the output temperature of the cold carrier medium from the cold carrier pump, and/or information about the cold requirement of the at least one cold consumer, and/or the pressure of the cold carrier medium in the cooling circuit in question.

If "control" is mentioned in connection with the description of this invention, on the one hand this includes the case whereby, in accordance with the specified reference lines, individual components of the cooling system are controlled without feedback. On the other hand,. this term also includes the case whereby components are feedback controlled, i.e. for regulation.

In accordance with the invention, it is possible to set the cold output dependent upon the current requirements. It is, therefore, proposed by a further development of the invention that the cold output is controllable so as to adapt to the current requirement for cold in the aircraft by turning individual cooling machines of the cold producing device on and off. In other words, if only a small amount of cold output is required, for example just one cooling machine is operated, and if there is a temporary requirement for increased cold output, at least one further cooling machine is additionally activated. In order to load all of the cooling machines used in the cooling system to the same degree, a further embodiment of the invention proposes that the central control unit controls the cooling machines in such a way that they essentially have the same operational duration with regard to time.

In one variation of the invention, the cold carrier medium can flow through both a cooling machine which is turned off and a cooling machine which is turned on. In this way, the mix temperature of the cold carrier medium in the preliminary run supply can be raised.

However, it is equally possible that a check valve and a bypass line which bypasses the cooling machine is associated to each cooling machine. This can prevent cold carrier medium from flowing through a cooling machine which is switched off and in so doing, already giving off cold.

As an alternative to the case described above where cooling machines are switched on to correspond to requirement, a further embodiment of the invention proposes that by means of the control device, the cold output of the at least one cooling machine is controllable, preferably continuously. In connection with this, it can, for example, be provided that the control unit records the output temperature of the cold carrier medium leaving the cooling machine, and controls the cooling machine in accordance with the output temperature measured.

With an alternative embodiment in accordance with the invention, the cold output of at least one cooling machine is changeable by means of a bypass valve and/or by varying the revolutions per minute of a compressor used in the cooling machine.

In addition to, or as an alternative to the possibilities for control or regulation of the cold output described above, it is also possible in accordance with the invention for the control unit used to control the cold output of the cooling system to change the conveyed quantity of cold carrier medium in the cooling circuit in question. Dependent upon the level of cold output required, more or less cold carrier medium is supplied from the cold producing device via the cold conveyance system to at least one cold consumer. This can be realised, for example, by the control unit used to control the cold output changing the revolutions per minute of at least one cold carrier pump.

BRIEF DESCRIPTION OF THE DRAWINGS

In the following, versions of this invention are discussed with reference to the attached figures.

DETAILED DESCRIPTION

Figure 1:
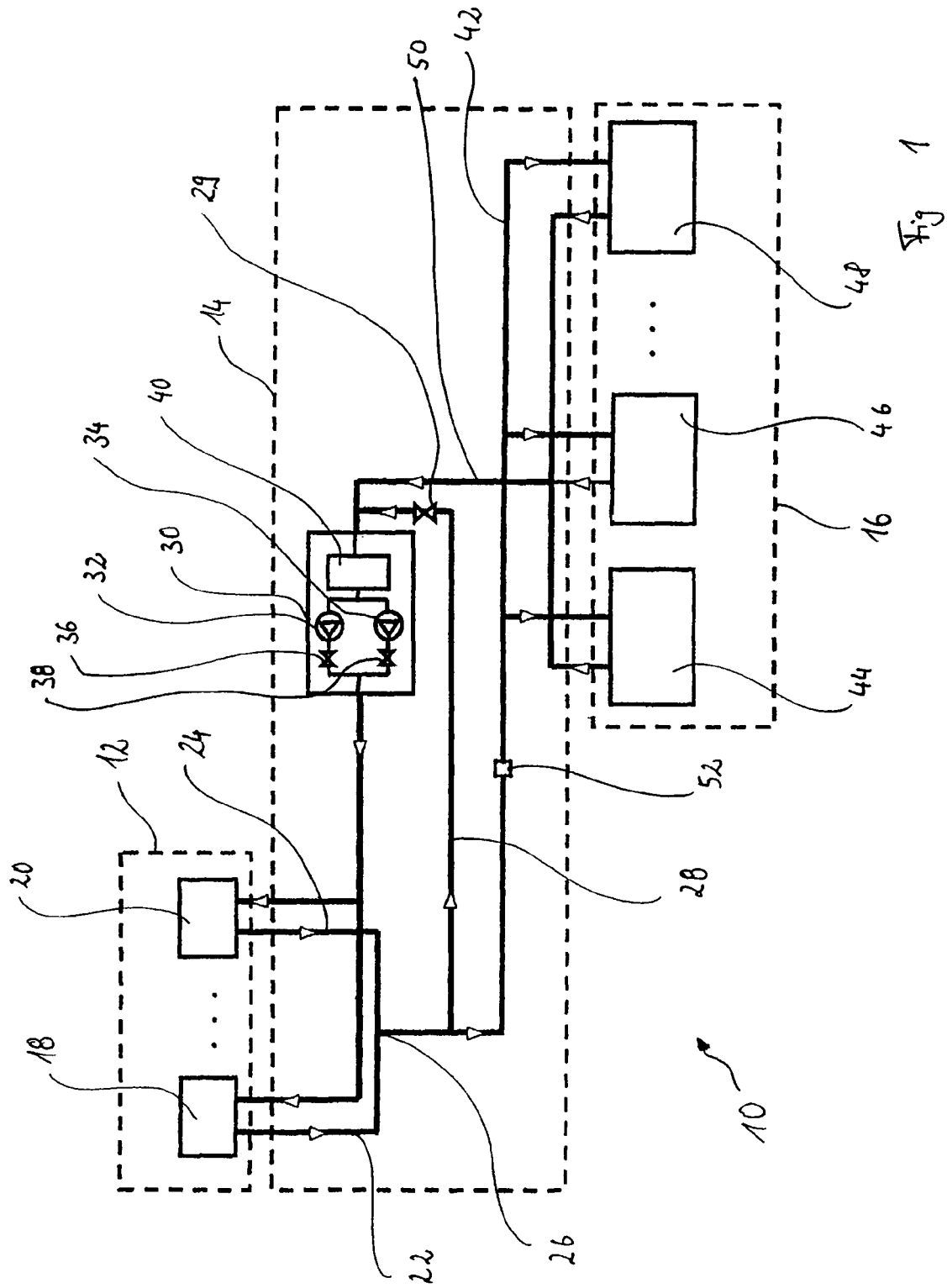
FIG. 1 represents a first version of a schematically drawn cooling system in accordance with the invention and FIG. 2 represents a second version of a schematically drawn cooling system in accordance with the invention.

In the attached FIG. 1, a cooling system in accordance with the invention is shown is by 10. This includes a cold producing device 12, a cold conveyance system 14 and an area 16, in which cold is consumed.

The cold producing device 12 has two cooling machines 18 and 20, in which a cold carrier medium is cooled down by means of a cold vapour process generally known in the field of thermodynamics, and supplied to the cold conveyance system 14 along two parallel lines 22 and 24 of a cooling circuit 25. In the cold conveyance system 14, the two parallel lines 22 and 24 are united at a point 26. Cold carrier medium is supplied to a pump unit 30 by means of a supply line 28 provided with a specially controllable check valve 29. The pump unit 30 has two pumps 32 and 34 which are controlled parallel to one another, and to which separately controllable check valves 36 and 38 are assigned. A cold carrier medium intermediary storage unit 40 is connected to the parallel arrangement of the pumps 32 and 34 in the pump unit 30. This serves to equalize volume if there are thermal expansion effects or leakage effects.

By means of the circulatory effect of the pump unit 30, cooled down cold carrier medium is supplied to different cold consumers 44, 46 and 48 by means of a supply line 42. The cold consumers 44, 46 and 48 are, for example, functional units which require cooling in the on-board kitchen (galley) of an aircraft, such as, for example, a cooling chamber which is filled with food and drinks, or computer units which must be cooled during use, or an aircraft video system.

The cooled cold carrier medium is supplied from the supply line 42 via individual lines to the respective cold consumers 44, 46, 48. The cold carrier medium is heated up in each of the cold consumers 44, 46, 48, i.e. it absorbs this heat. In other words,. the cold carrier medium dispenses its "cold" to the cold consumers 44, 46, 48. The correspondingly warmed up cold carrier medium is then taken back to the cooling machines 18 and 20 of the cold producing device 12 through the cold conveyance system 14 via a return line 50 by means of the pump unit 30. There, the cold carrier medium which has meanwhile heated up, is cooled back down, and can be taken back into the cold conveyance system 14 via the lines 22 and 24.

Depending upon the size of the aircraft and the requirement for cold within the aircraft, the cooling system can be arranged and controlled differently. It is possible, for example, if there is likely to be a relatively large requirement for cold, to provide more cooling machines which can then be turned on as required, i.e. in operational situations where there is a large requirement for cold, and can be switched to idling state or totally turned off in operational situations where there is limited requirement for cold.

Equally, it is possible, when there is a large requirement for cold, to switch the check valve 29 to a check position so that all of the cooled-down cold carrier medium is supplied to the cold consumers 44, 46, 48 via the supply line 42. In an operational state, however, where there is limited requirement for cold, the check valve 29 is opened so that part of the cooled-down cold carrier medium is supplied to the cooling machines 18 and 20 by means of the pump unit 30.

Another possibility for the control of the cold output of the cooling system 10 is to control the circulation pumps 32 and 34 dependent upon requirement. A variation of the invention therefore proposes that the revolutions per minute of the pumps 32 and 34 can be continuously changed, and so the supply output of pumps 32 and 34 can also be changed within certain limits.

With the cooling system 10, it is also possible to open or to close the check valves 36 and 38 assigned to the pumps 32 and 34 dependent upon the current cold output requirement. This means that the valve position of check valves 36 and 38 can continuously be changed between a fully open position and a fully closed position. The same applies for check valve 29. In this way, the supply volume of the cold conveyance system can also be specifically set.

Control of the pumps 32 and 34 and of the check valves 29, 36, 38 can, for example, be carried out dependent upon pressure values which are measured at different points within the cold conveyance system 14, for example by a sensor 52 in the lines 42. Moreover, each of the consumers 44, 46, 48 can have a temperature sensor whereby the different controllable components of the system, such as the cold machines 18, 20, the pumps 32 and 34, and the individual check valves 29, 36 and 38 can be controlled dependent upon the temperatures measured in the consumers 44, 46 and 48. It is clear to the man skilled in the art that parameters for the cold carrier medium can also be measured at a number of other points within the cooling system 10, such as temperature, pressure, flow speed etc., and the aforementioned controllable components of the cooling system 10 can be controlled with reference to the values measured.

The invention shows a cooling system 10 with which a number of different cold consumers 44, 46, 48 can be cooled centrally with a sufficiently strongly cooling cold carrier medium for the purpose of safe and reliable operation, whereby the cold output of the cooling system 10 can be adapted to the current requirement for cold. In this way, the degree of efficiency during partial loading operation, i.e. with a relatively low current requirement for cold, can be increased. Ultimately, this leads to reduced consumption of electrical energy within the aircraft which also means reduced fuel consumption of the aircraft. Moreover, with the cooling system 10 in accordance with the invention, the cooling machines 18, 20 used are not continuously operational, but can be switched off as required. This means that their operational life can be considerably extended.

Figure 2:
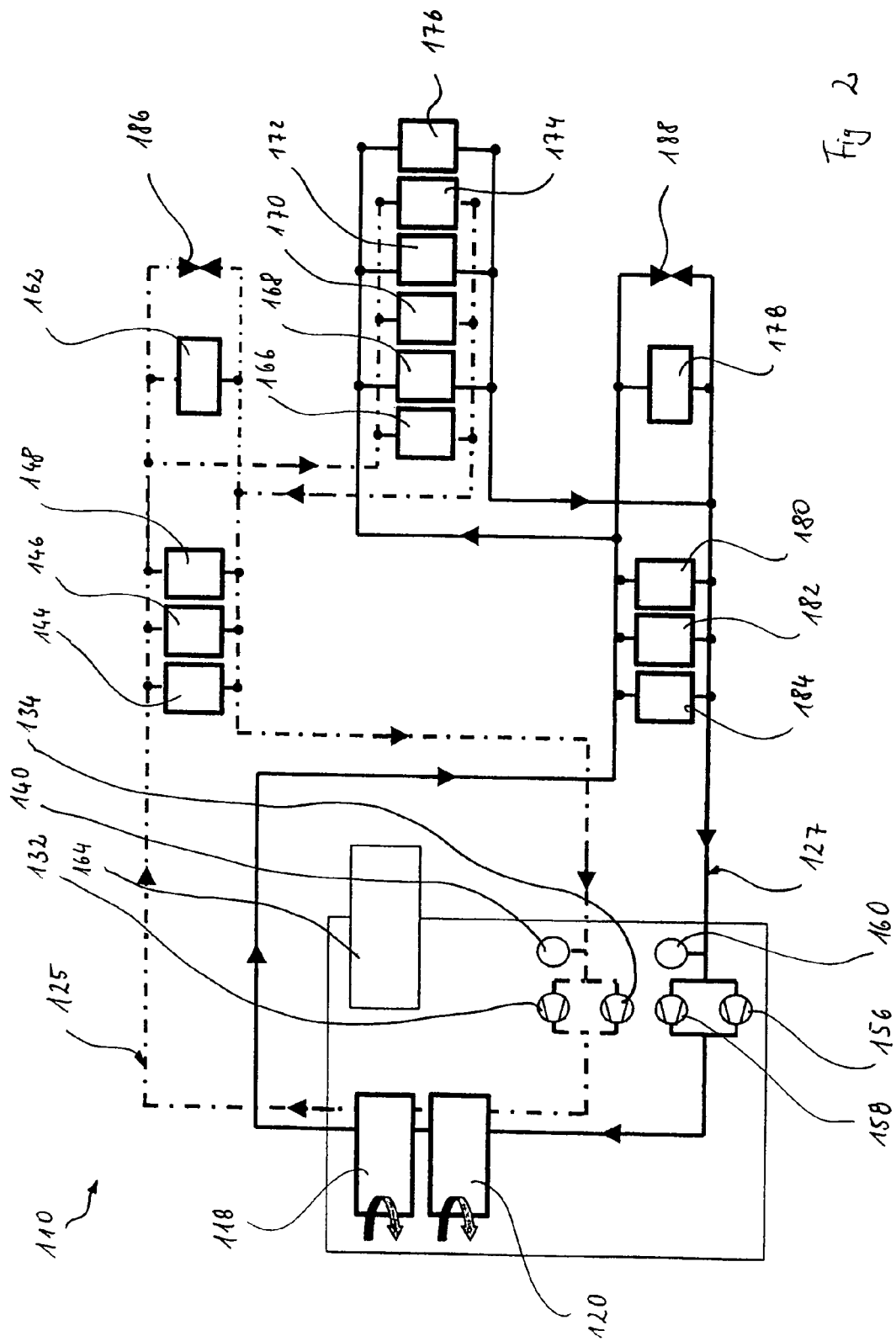

FIG. 2 shows a second embodiment of a cooling system in accordance with the invention which is generally identified by 110. In order to avoid repetition, in the following description of FIG. 2, the same reference numbers will be used for components operating in the same way or of the same type as with the previous description of FIG. 1, but modified with by "1".

FIG. 2 shows that the cold conveyance system is subdivided into two cooling circuits 125 and 127. The cooling circuit 125, shown in FIG. 2 by hatched lines, is hydraulically uncoupled from the cooling circuit 127, which is shown in FIG. 2 with continuous lines. Both cooling circuits 125 and 127 are thermally coupled with the cooling machines 118 and 120 in which the cold carrier medium supplied to the cooling circuits 125 and 127 is cooled down. In both cooling circuits 125 and 127, two circulation pumps are respectively provided, i.e. in cooling circuit 125 the circulation pumps 132 and 134, and in cooling circuit 127, the circulation pumps 156 and 158. Circulation pumps 132 and 134 and circulation pumps 156 and 158 are controlled respectively in parallel to one another. A storage unit for cold carrier medium is connected to each parallel control of the circulation pumps, i.e. storage unit 140 in cooling circuit 125 and storage unit 160 in cooling circuit 127.

The cooling machines 118 and 120, circulation pumps 132 and 134 as well as 158 and 156 and the storage units 140 and 160 are combined in one central unit 164, and positioned at a point within the aircraft where they do not form an obstruction. From this central unit 164, cold carrier medium can then be supplied to the different cold consumers by means of the lines of cooling circuits 125 and 127.

The cooling circuit 125 has, for example, the cold consumers 144, 146 and 148 in the form of galley air coolers of an on-board kitchen (galley) positioned on the side of the aircraft. In addition, the cooling circuit 125 has an electronic air cooler 162 with which an electronic appliance of the aircraft is cooled. Moreover, another section of kitchen air coolers for on-board kitchens (galleys) positioned in the centre of the aircraft is supplied with cold by means of the cooling circuit 125, namely kitchen air coolers 166, 170 and 174. Finally, a check valve 186 is also provided in the cooling circuit 125 in order to be able to vary the flow of cold conveyance medium through the cooling circuit 125.

The cooling circuit 127, on the other hand, supplies the galley air coolers 180, 182 and 184 with cold. Moreover, the electronic cooler 178 is also supplied with cold from the cooling circuit 127. In addition, the cooling circuit 127 cools another section of galley air coolers of the galleys positioned in the centre of the aircraft, namely galley air coolers 168, 172 and 176. The Cooling circuit 127 also has a check valve 188 with which the flow of cold carrier medium can be controlled.

Based upon the schematic representation in accordance with FIG. 1, FIG. 2 shows that, with the cooling system in accordance with the invention, different cold consumers can be supplied with cold carrier medium more or less as desired, dependent upon requirement and the aircraft fittings, and at the same time high safety standards can be met. The advantage of the version in accordance with FIG. 2, for example, is that a minimum cold output can be provided even if one of the cooling machines 118 and 120 in both cooling circuits 125 and 127 fail. Even if one of the circulation pumps within a cooling circuit 125 and 127 fails, the supply of cold carrier medium can still be guaranteed by the parallel control of pumps 132 and 134 as well as 158 and 156. Even if one of the cooling circuits 125 and 127 completely fail as a result of leakage effects or other defects, cooling of the essential functional units within the aircraft is guaranteed because the respective other cooling circuit, which is still functional, will provide cooled cold carrier medium.

The invention claimed is:

1. A cooling system for the cooling of heat producing devices in an aircraft, comprising: a central cold producing device including at least two cooling machines working independently of each other, at least one cold consumer, and a cold conveyance system which connects the cold producing device and the at least one cold consumer, the cold conveyance system including at least two independent cooling circuits each of the at least two independent cooling circuits coupled to the cold producing device so as to supply supplying a cold carrier medium that has been cooled by the cold producing device to the at least one cold consumer and return returning the cold carrier medium from the at least one cold consumer to the cold producing device, whereby the at least two cooling machines are coupled in parallel to the cold conveyance system such that each of the at least two independent cooling circuits are thermally coupled to the at least two cooling machines; and wherein the at least two cooling machines use air outside of the pressure cabin of the aircraft as a heat sink in order to expel heat, and the warm extracted air is expelled outside of the pressure cabin.

2. The cooling system in accordance with claim 1, wherein the number of cooling machines of the cold producing device is configured to cover a cold requirement for the aircraft during ground operation.

3. The cooling system in accordance with claim 1, wherein one of the at least two independent cooling circuits is provided in each of a front half of the aircraft and a rear half of the aircraft.

4. The cooling system in accordance with claim 1, wherein one of the at least two independent cooling circuits is provided on each side of the aircraft in relation to a longitudinal axis of the aircraft.

5. The cooling system in accordance with claim 4, wherein cold consumers positioned in the center of the aircraft are supplied with the cold carrier medium from the at least two independent cooling circuits.

6. The cooling system in accordance with claim 1, wherein each independent cooling circuit includes at least one cold carrier pump for the circulation of the cold carrier medium.

7. The cooling system in accordance with claim 6, wherein at least two cold carrier pumps are assigned to each independent cooling circuit and are supplied with electric energy independently of one another.

8. The cooling system in accordance with claim 1, wherein at least one storage unit for intermediary storage of the cold carrier medium is assigned to each independent cooling circuit.

9. The cooling system in accordance with claim 1, wherein each of the at least two independent cooling circuits are thermally coupled to the cold consumer by a heat exchanger.

10. The cooling system in accordance with claim 1, wherein the at least one cold consumer has a secondary cold conveyance system in which cold is transferred from the cold carrier medium by a secondary cold carrier.

11. The cooling system in accordance with claim 1, further comprising:
a central control unit configured to control the cold output of each of the at least two independent cooling circuits dependent upon at least one of the specified parameters for a current cold requirement.

12. The cooling system in accordance with claim 11, wherein the specified parameters reflect the temperature of the cold carrier medium measured in at least one point in the independent cooling circuits and/or information about the current cold requirement and/or a pressure of the cold carrier medium in the cooling.

13. The cooling system in accordance with claim 11, wherein the cold output of the at least two cooling machines is continuously controllable by the central control unit.

14. The cooling system in accordance with claim 11, wherein the central control unit records an output temperature of the cold carrier medium leaving the at least two cooling machines and controls the at least two cooling machines in accordance with the output temperature measured and recorded.

15. The cooling system in accordance with claim 14, wherein the cold output of the at least two cooling machines can be changed by a bypass valve and/or by varying a speed of a compressor used in the at least two cooling machines.

16. The cooling system in accordance with claim 11, wherein the central control unit changes a quantity of the cold carrier medium supplied in each of the independent cooling circuits.

17. The cooling system in accordance with claim 16, wherein the central control unit changes a speed of at least one cold carrier pump in the at least two independent cooling circuits.

18. The cooling system in accordance with claim 1, wherein the cold output is controlled so as to adapt to a current cold requirement in the aircraft by turning individual cooling machines of the cold producing device on and off.

19. The cooling system in accordance with claim 1, wherein a check valve and a bypass line which bypasses the cooling machine are assigned to each cooling machine.

20. The cooling system in accordance with claim 1, wherein each independent cooling circuit is supplied with electric energy, independently of at least one other independent cooling circuit.

21. An aircraft with the cooling system in accordance with claim 1.

* * * * *